US011887769B2

(12) United States Patent
Kim et al.

(10) Patent No.: US 11,887,769 B2
(45) Date of Patent: Jan. 30, 2024

(54) INDUCTOR

(71) Applicant: SAMSUNG ELECTRO-MECHANICS CO., LTD., Suwon-si (KR)

(72) Inventors: Seung Hee Kim, Suwon-si (KR); Jong Min Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 650 days.

(21) Appl. No.: 16/597,737

(22) Filed: Oct. 9, 2019

(65) Prior Publication Data

US 2020/0168387 A1 May 28, 2020

(30) Foreign Application Priority Data

Nov. 22, 2018 (KR) ........................ 10-2018-0145452

(51) Int. Cl.

*H01F 27/24* (2006.01)
*H01F 27/28* (2006.01)
*H01F 27/29* (2006.01)
*H01F 41/04* (2006.01)
*H01F 27/255* (2006.01)

(52) U.S. Cl.

CPC ....... *H01F 27/2804* (2013.01); *H01F 27/255* (2013.01); *H01F 27/29* (2013.01); *H01F 41/041* (2013.01); *H01F 2027/2809* (2013.01)

(58) Field of Classification Search

CPC .... H01F 27/2804; H01F 27/255; H01F 27/29; H01F 41/041; H01F 2027/2809; H01F 2017/048; H01F 17/0013; H01F 27/292; H01F 27/306; H01F 17/0006; H01F 17/04

See application file for complete search history.

(56) References Cited

U.S. PATENT DOCUMENTS 10,720,276 B2 * 7/2020 Ueyama .............. H01F 17/0013
2014/0009254 A1 * 1/2014 Ohkubo .............. H01F 17/0033 336/192
2014/0062636 A1 * 3/2014 Yang ....................... H01F 17/04 336/83

(Continued)

FOREIGN PATENT DOCUMENTS

KR 10-2015-0019730 A1 2/2015
KR 10-2016-0031391 A 3/2016
KR 10-2018-0012618 A 2/2018

OTHER PUBLICATIONS

Office Action issued in corresponding Korean Patent Application No. 10-2018-0145452 dated Feb. 14, 2023, with English translation.

*Primary Examiner* — Mang Tin Bik Lian
(74) *Attorney, Agent, or Firm* — Morgan, Lewis & Bockius LLP

(57) ABSTRACT

An inductor includes a body, a coil pattern embedded in the body, a first external electrode and a second external electrode disposed on one surface of the body to be respectively connected to both ends of the coil pattern, and a support member disposed inside the body to support the coil pattern, wherein b/a≥1.5, in which "a" denotes a distance from a central surface between top and bottom surfaces of the support member to a top surface of the body, and "b" denotes a distance from the central surface of the support member to a bottom surface of the body.

17 Claims, 4 Drawing Sheets

I-I'

I-I'

(56) References Cited

U.S. PATENT DOCUMENTS

| | | | | |
|---|---|---|---|---|
| 2014/0145797 | A1* | 5/2014 | Bae | H01F 17/0013 333/185 |
| 2015/0035640 | A1 | 2/2015 | Wang et al. | |
| 2015/0048915 | A1 | 2/2015 | Yoon et al. | |
| 2015/0116966 | A1* | 4/2015 | Lee | H01G 4/30 361/767 |
| 2016/0099102 | A1* | 4/2016 | Matsunaga | H01F 17/0013 336/105 |
| 2016/0322154 | A1* | 11/2016 | Park | H01F 17/04 |
| 2017/0150606 | A1* | 5/2017 | Yoon | H01F 17/0033 |
| 2017/0316867 | A1* | 11/2017 | Kamijima | H01F 17/0013 |
| 2018/0033538 | A1 | 2/2018 | Yoon et al. | |
| 2018/0166206 | A1* | 6/2018 | Ueyama | H01F 17/0013 |
| 2018/0277296 | A1* | 9/2018 | Endo | H01F 41/046 |
| 2019/0006088 | A1* | 1/2019 | Tomonari | H01F 27/2847 |

* cited by examiner

INDUCTOR

CROSS-REFERENCE TO RELATED APPLICATION(S)

This application claims the benefit of priority to Korean Patent Application No. 10-2018-0145452 filed on Nov. 22, 2018 in the Korean Intellectual Property Office, the entire disclosure of which is incorporated herein by reference.

TECHNICAL FIELD

The present disclosure relates to an inductor.

BACKGROUND

In accordance with the miniaturization and thinning of electronic devices such as digital TVs, mobile phones, laptop PCs, and the like, there is an increasing demand for miniaturization and thinning of coil components used in such electronic devices. In order to meet such demand, research and development into developing a winding type or thin-film type coil component having various forms have been actively undertaken.

An inductor, a coil component, is a representative passive electronic component, used together with a resistor and a capacitor in electronic devices.

As electronic devices are designed to have higher performance and to be reduced in size, electronic components used in electronic devices have been increased in number and reduced in size.

SUMMARY

According to an aspect of the present disclosure, an inductor in which a lower cover portion has a thickness greater than a thickness of an upper cover portion can make it possible to prevent a defective waveform caused by a short distance between an external electrode disposed on a bottom surface of an inductor and a coil.

More specifically, according to an aspect of the present disclosure, a low-profile inductor in which flow of flux is not disturbed can be provided by designing a ratio of a distance from a central surface between a top surface and a bottom surface of a support member to a top surface of a body and a distance from the central surface of the support member to a bottom surface of the body.

According to an aspect of the present disclosure, an inductor includes a body, a coil pattern embedded in the body, a first external electrode and a second external electrode disposed on one surface of the body to be respectively connected to both ends of the coil pattern, and a support member disposed inside the body to support the coil pattern in a thickness direction of the body, wherein $b/a \geq 0.5$, in which "a" denotes a distance from a central surface between top and bottom surfaces of the support member to a top surface of the body in the thickness direction, and "b" denotes a distance from the central surface of the support member to a bottom surface of the body in the thickness direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
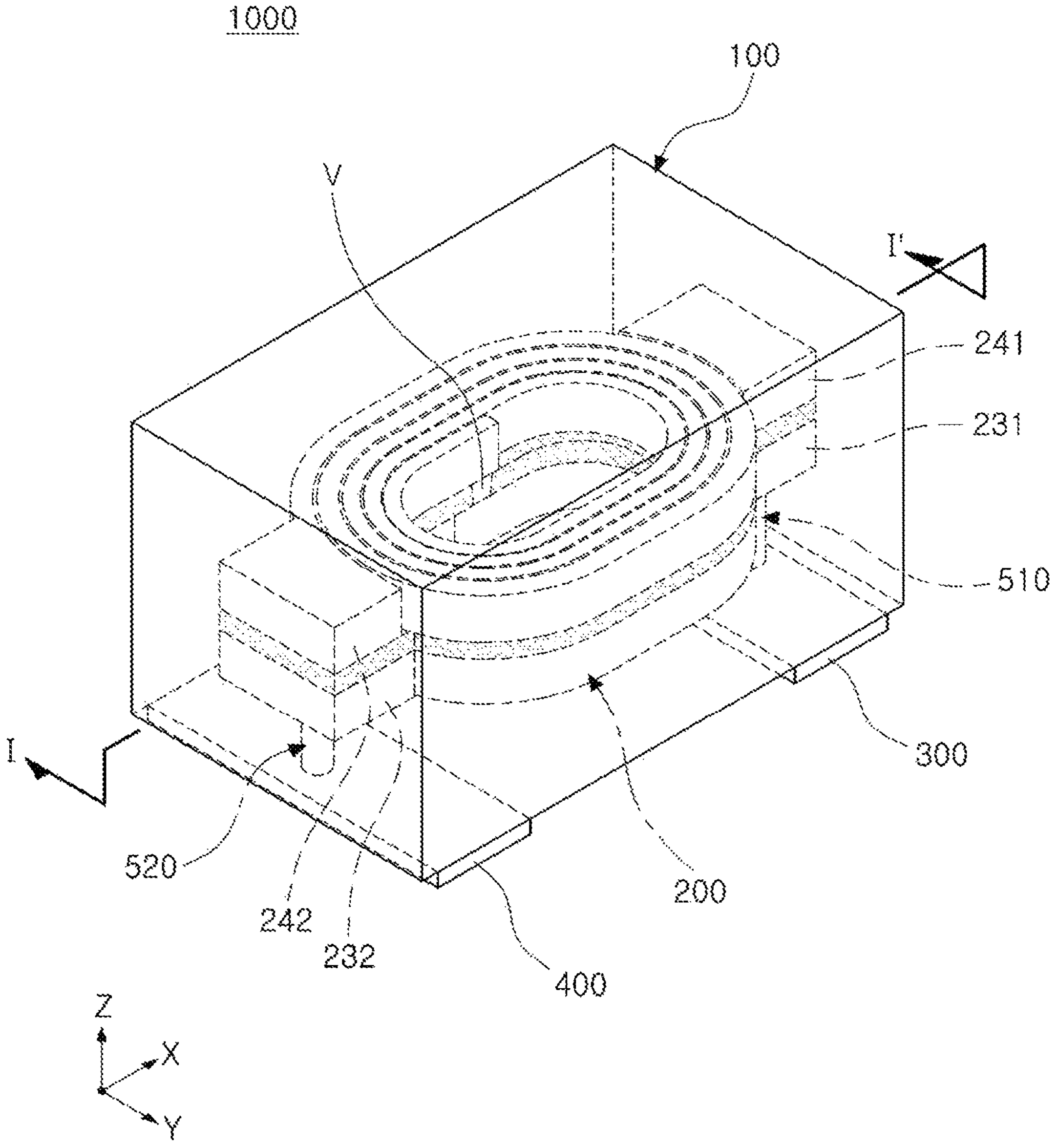
FIG. 1 is a schematic diagram of an inductor according to an exemplary embodiment in the present disclosure.

Hereinafter, exemplary embodiments of the present disclosure will be described as follows with reference to the attached drawings. The disclosure may, however, be embodied in many different forms and should not be construed as being limited to the exemplary embodiments set forth herein. Rather, these exemplary embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

FIG. 1 is a schematic diagram of an inductor according to an exemplary embodiment in the present disclosure.

Figure 2A:
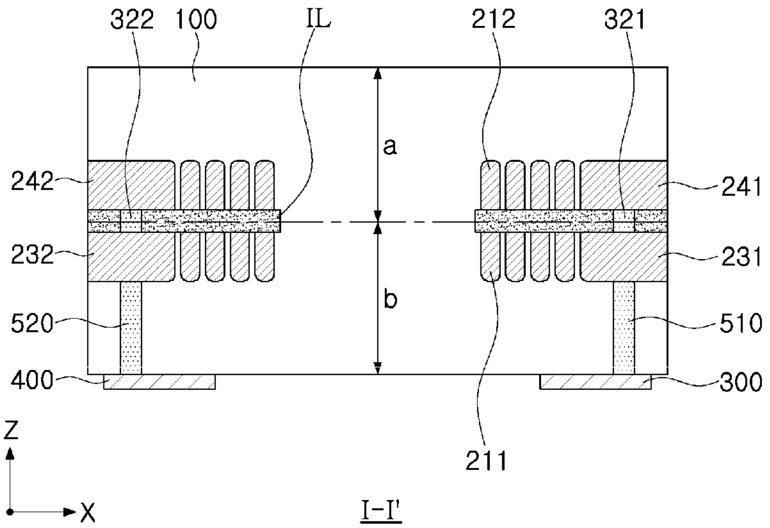
FIGS. 2A and 2B are cross-sectional views of an inductor according to various exemplary embodiments in the present disclosure in an X-Z direction.
Figure 2B:
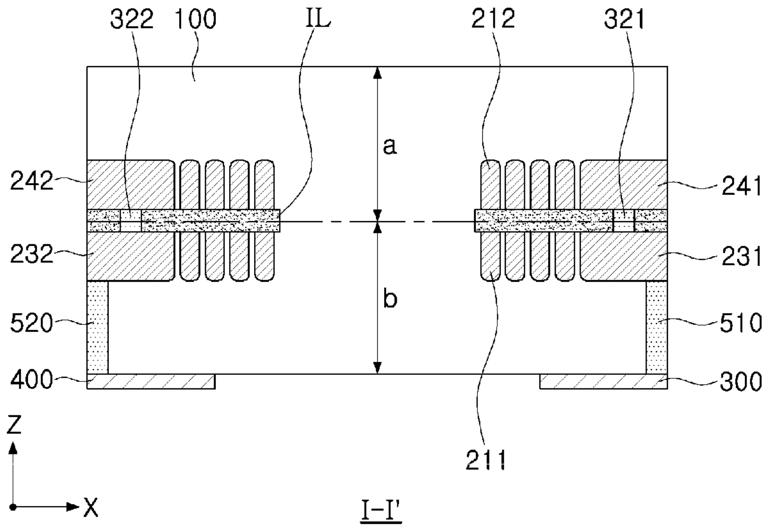

FIGS. 2A and 2B are cross-sectional views of an inductor according to various exemplary embodiments in the present disclosure in an X-Z direction.

Figure 3:
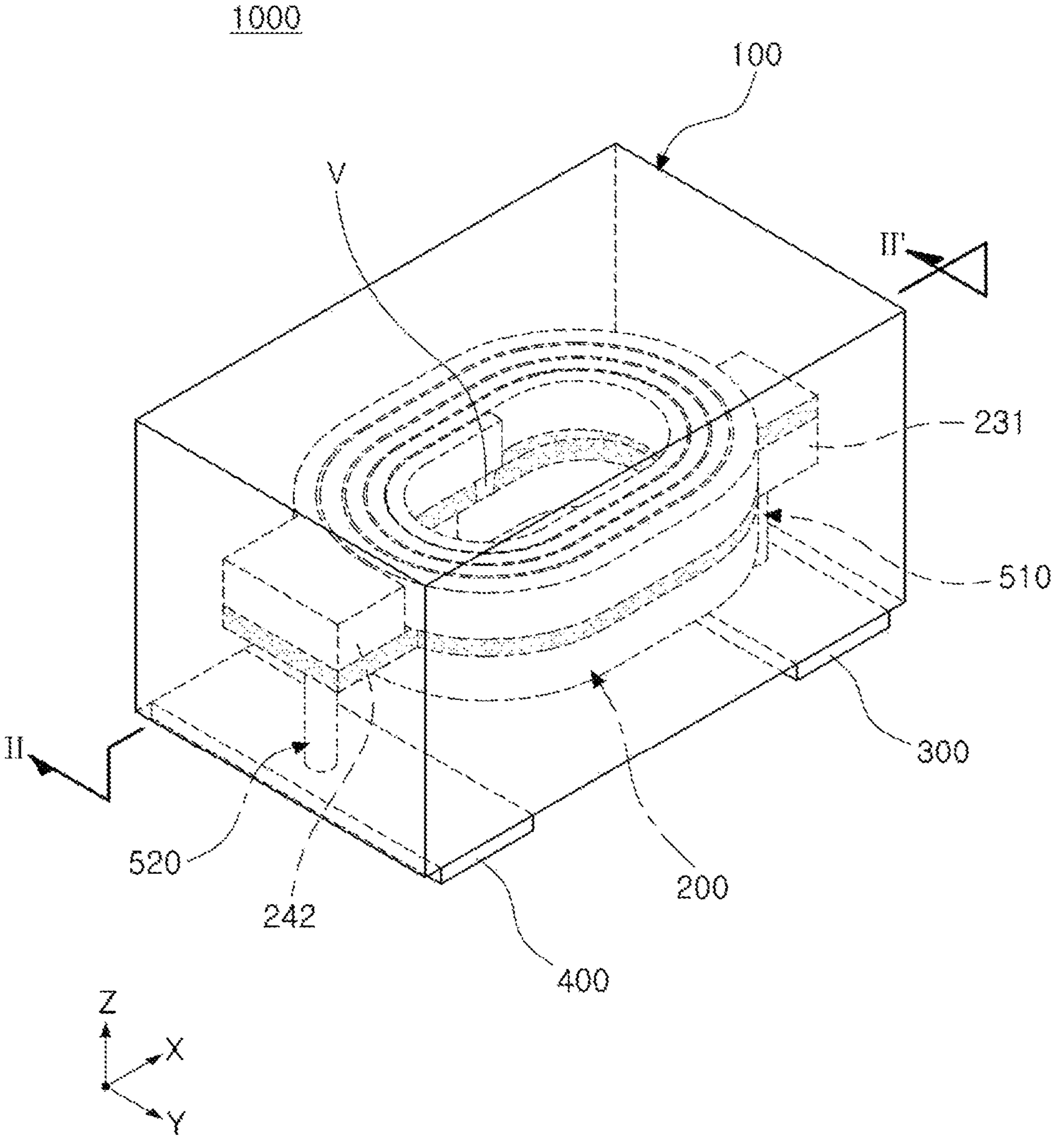
FIG. 3 is a schematic diagram of an inductor according to an exemplary embodiment in the present disclosure.

FIG. 3 is a schematic diagram of an inductor according to an exemplary embodiment in the present disclosure.

Figure 4:
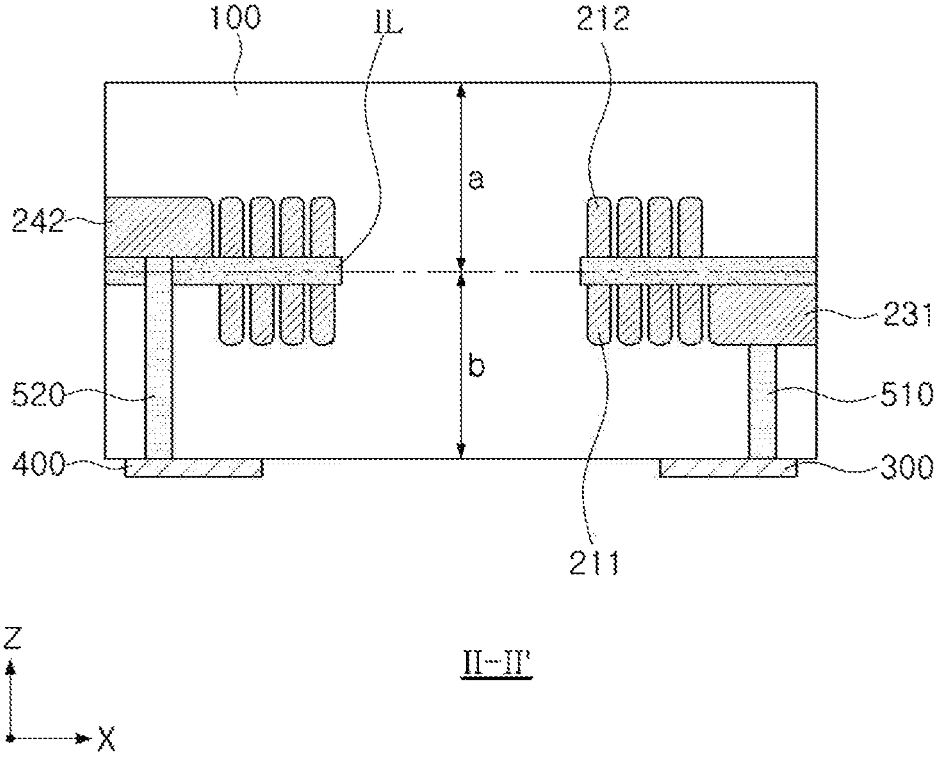
FIG. 4 is a cross-sectional view of an inductor according to an exemplary embodiment in the present disclosure in an X-Z direction.

FIG. 4 is a cross-sectional view of an inductor according to an exemplary embodiment in the present disclosure in an X-Z direction.

A body 100 may include magnetic metal powder particles and a thermosetting resin. Specifically, the body 110 may be formed by laminating one or more magnetic composite sheets including a thermosetting resin and magnetic metal powder particles dispersed in the thermosetting resin. Alternatively, the body 100 may have a structure different from the structure in which magnetic metal powder particles are dispersed in a thermosetting resin. For example, the body 100 may include magnetic metal powder particles such as ferrite powder particles.

The ferrite power particles may include at least one of, for example, spinel type ferrites such as ferrites that are Mg—Zn-based, Mn—Zn-based, Mn—Mg-based, Cu—Zn-based, Mg—Mn—Sr-based, Ni—Zn-based, hexagonal ferrites such as ferrites that are Ba—Zn-based, Ba—Mg-based, Ba—Ni-based, Ba—Co-based, Ba—Ni—Co-based, or the like, garnet ferrites such as Y-based ferrite, and Li-based ferrite.

Magnetic metal powder particles may include at least one selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particles may include at least one of pore ion power particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles, and Fe—Cr—Al-based alloy powder particles.

The metallic magnetic powder particles may be amorphous or crystalline. For example, the magnetic metal powder particles may be Fe—Si—B—Cr-based amorphous alloy powder particles, but is not limited thereto.

Each of the ferrite and the magnetic metal powder particles may have an average diameter of about 0.1 μm to about 30 μm, but an example of the average diameter is not limited thereto.

The body 100 may include two or more different types of magnetic materials dispersed in a resin. The expression "different types of magnetic materials" refers to the fact the magnetic materials, dispersed in the resin, are distinguished from each other by any one of an average diameter, a composition, crystallinity, and a shape.

The resin may include epoxy, polyimide, liquid crystal polymer, and the like, alone or in combination, but a material of the resin is not limited thereto.

The body 100 may include a core penetrating through a coil pattern 200 including first and second coil patterns 211 and 212 and first, second, third, and fourth lead-out patterns 231, 242, 232, and 241. The core may be formed by filling a through-hole of the coil pattern 200 with a magnetic composite sheet, but formation of the core is not limited thereto.

The support member IL may be disposed in the body 100. The support member IL may be in contact with the first and second coil patterns 211 and 212 and the first, second, third, and fourth lead-out patterns 231, 242, 232, and 241 to support a coil.

The support member IL may include an insulating material including an epoxy resin, a thermoplastic resin such as polyimide, or a photosensitive thermosetting resin, or an insulating material in which a reinforcing material such as glass fiber or an inorganic filler is impregnated in this thermosetting resin. As an example, the support member IL may include an insulating material such as prepreg, an Ajinomoto build-up film (ABF), FR-4, a Bismaleimide Triazine (BT) resin, a photoimageable dielectric (PID), or the like, but a material of the support member is not limited thereto.

The inorganic filler may be at least one selected from the group consisting of silica ($SiO_2$), alumina ($Al_2O_3$), silicon carbide (SiC), barium sulfate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support member IL includes an insulating material containing a reinforcing material, the support member IL may provide more excellent rigidity. When the support member IL includes an insulating material including no glass fiber, the support member IL may be advantageous for thinning of the entire coil pattern 200. When the support member IL includes an insulating material including a photosensitive insulating resin, the number of processes may be decreased, which is advantageous for reducing manufacturing cost and forming a fine via.

The coil pattern 200 may be embedded in the body 100 to exhibit characteristics of a coil component. For example, when the coil component 1000 according to this embodiment is used as a power inductor, the coil pattern 200 may serve to stabilize power of an electronic device by storing an electric field as a magnetic field and maintaining an output voltage.

The coil pattern 211 and 212 may be disposed on a first surface and a second surface of the support member IL, opposing each other, and include first and second coil patterns 211 and 212 and first, second, third, and fourth lead-out patterns 231, 242, 232, and 241. The first and second coil patterns 211 and 212 may be formed using a photolithography process or a plating process.

Specifically, on the basis of directions of FIGS. 2A, 2B and 4, the first coil pattern 211, the first lead-out pattern 231, and the third lead-out pattern 232 may be disposed on a bottom surface of the support member IL in the body 100, and the second coil pattern 212, the second lead-out pattern 242, and the fourth lead-out pattern 241 may be disposed on a top surface of the support member IL.

According to one aspect of the present disclosure, referring to FIGS. 1 to 4, the first and second coil patterns 211 and 212 may be connected through a via V. The first and fourth lead-out patterns 231 and 241 may be connected through a via 321 penetrating the support member IL, and the second and third lead-out patterns 232 and 242 may be connected through a via 322 penetrating the support member IL.

Referring to FIGS. 2A, 2B and 4, the first coil pattern 211 may be in contact with and connected to the first lead-out pattern 231 on the bottom surface of the support member IL, and the first coil pattern 211 and the first lead-out pattern 231 may be spaced apart from the third lead-out pattern 232. The second coil pattern 212 may be in contact with and connected to the second lead-out pattern 242 on the top surface of the support member IL, and the second coil pattern 212 and the second lead-out pattern 242 may be spaced apart from the fourth lead-out pattern 241. A first connection electrode 510 may penetrate through the support member IL to be in contact with the first lead-out pattern 231 and the fourth lead-out pattern 241, and a second connection electrode 520 may penetrate through the support member IL to be in contact with the third lead-out pattern 232 and the second connection pattern 242. Thus, the coil pattern 200 may generally serve as a single coil forming one or more turns around the core.

Each of the first coil pattern 211 and the second coil pattern 212 may be in the form of a flat spiral having at least one turn formed around the core. For example, the first coil pattern 211 may include at least one turn around the core on the bottom surface of the support member IL.

At least one of the coil patterns 211 and 212, the connection electrodes 510 and 520, and the lead-out patterns 231, 242, 232, and 241 may include at least one conductive layer.

As an example, when the second coil pattern 212, the second and fourth lead-out patterns 241 and 242, and the connection electrodes 510 and 520 are disposed on one surface of the support member IL by plating, each of the second coil pattern 212, the second and fourth lead-out patterns 241 and 242, and the connection electrodes 510 and 520 may include a seed layer such as an electroless plating layer and an electroplating layer. The electroplating layer may have a single-layer structure or a multilayer structure. The electroplating layer of the multilayer structure may be formed in a conformal film structure in which one electroplating layer is covered with another electroplating layer, and may be formed so that the other electroplating layer is only laminated on one surface of the one electroplating layer. The seed layer of the second coil pattern 212, the seed layers of the second and fourth lead-out patterns 241 and 242, and the seed layers of the connection electrodes 510 and 520 may be formed integrally with each other, such that boundaries therebetween may not be formed, but are not limited thereto. The electroplating layer of the second coil pattern 212, the electroplating layers of the second and fourth lead-out patterns 241 and 242, and the electroplating layers of the connection electrodes 510 and 520 may be formed integrally with each other, such that boundaries therebetween are not formed, but are not limited thereto.

Each of the coil patterns 211 and 212, the first and third lead-out patterns 231 and 232, the second and fourth lead-out patterns 242 and 241 and the vias 321 and 322 may be formed of a conductive material such as copper (Cu), aluminum (Al), silver (Ag), tin (Sn), gold (Au), nickel (Ni), lead (Pb), titanium (Ti), or alloys thereof, but a material thereof is not limited thereto.

Referring to FIG. 4, when the first and second lead-out patterns 231 and 242 are present, the third and fourth lead-out patterns 232 and 241 have no relation to an electrical connection (e.g., dummy lead-out patterns) between the other elements of the coil pattern 200. Therefore, the third and fourth lead-out patterns 232 and 241 may be omitted in the present disclosure.

Referring to FIGS. 1, 2A, 2B, 3 and 4, the external electrodes 300 and 400 are spaced from each other on one surface of the body 100 to be respectively connected to both ends of the coil portion 200 inside the body 100. In FIGS. 1 and 3, a width of the body 100 is illustrated as being equal to a length of each of the external electrodes 300 and 400 in a width direction Y of the body 100. However, since the width and length thereof are merely exemplary, each of the external electrodes 300 and 400 may have a size different from that of FIG. 1.

The external electrodes 300 and 400 may be formed to have a single-layer structure or a multilayer structure. As an example, the first external electrode 300 may include a first layer including copper (Cu), a second layer, disposed on the first layer, including nickel (Ni), and a third layer, disposed on the second layer, including tin (Sn). As another example, the first external electrode 300 may include a resin electrode, including conductive powder particles and a resin, and a plating layer formed on the resin electrode by plating.

The external electrodes 300 and 400 may include a metal such as copper (Cu), aluminum (Al), silver (Ag), tin (Sn), gold (Au), nickel (Ni), lead (Pb), titanium (Ti), or alloys thereof, but a material of the external electrode 300 and 400 is not limited thereto.

According to the present disclosure, $b/a \geq 1.5$ in which "a" denotes a distance from a central surface between the top and bottom surfaces of the support member IL to the top surface of the body 100, and "b" denotes a distance from the central surface of the support member to the bottom surface of the body 100. In detail, a ratio of "a" and "b", satisfying $1.5 \leq b/a \leq 1.7/0.8$, was specified to prevent a defective waveform caused by a narrow gap between an external electrode and a coil and to secure capacity of inductance of a low-profile inductor.

According to one aspect of the present disclosure, an inductor may be manufactured under the following conditions to compare presence or absence of a defective waveform and possibility of implementing capacity of the inductor. Characteristics of products were compared while varying a length "a" from a central surface between top and bottom surfaces of a support member to a top surface of a body and a length "b" from the central surface of the support member to a bottom surface of the body in Comparative Examples and Inventive Examples.

TABLE 1

| Classification | a:b | Presence or absence of defective waveform | Possibility to implement capacity |
|---|---|---|---|
| Comparative Example 1 | 5:5 | present | possible |
| Comparative Example 2 | 4.5:5.5 | absent | possible |
| Inventive Example 1 | 4:6 | absent | possible |
| Inventive Example 2 | 3.8:6.2 | absent | possible |
| Inventive Example 3 | 3.5:6.5 | absent | possible |
| Inventive Example 4 | 3.3:6.7 | absent | possible |
| Inventive Example 5 | 3.2:6.8 | absent | possible |
| Comparative Example 3 | 3:7 | absent | impossible |
| Comparative Example 4 | 2:8 | impossible to implement chip | impossible |

As a result of comparison of the above components, it was found that, in terms of a defective waveform, there was no defect (or less defects) when a:b was 4:6 to 3:7. Also it was found that, in terms of capacity of inductance, characteristics could be implemented when a:b was 5:5 to 3.2:6.8. In conclusion, when a ratio of "a" and "b" was 4:6 to 3.2:6.8 proposed in this embodiment, the capacity of inductance could be implemented while preventing a defective waveform from occurring between an external electrode and a coil. Accordingly, a parameter b/a, representing a relationship between the lengths "a" and "b", was defined in the present disclosure. In addition, when $b/a \geq 1.5$, a defective waveform was prevented and capacity characteristics were implemented. In detail, the result supports that when $b/a \leq 1.7/0.8$, the above characteristics could be significantly increased.

The first and second connection electrodes 510 and 520 may penetrate through the body 100 to connect the first and second external electrodes 300 and 400 to the first and second coil patterns 211 and 212, respectively. The first connection electrode 510 may connect the first external electrode 300 and the first lead-out pattern 231 to each other, and the second connection electrode 520 may connect the second external electrode 400 and the third lead-out pattern 232 to each other. The connection electrodes 510 and 520 may extend from the lead-out pattern to the first and second external electrodes 300 and 400.

The connection electrodes 510 and 520 may be formed on the first and third lead-out patterns 231 and 232 before a process of laminating a magnetic composite sheet to form the body 100, or by laminating a magnetic composite sheet, forming a hole to penetrate through at least a portion of the magnetic composite sheet, and filling the hole with a conductive material. In the case of the former, since a seed layer is not needed when the connection electrodes 510 and 520 are formed by electroplating, the connection electrodes 510 and 520 may be formed of only an electroplating layer. As compared with the latter, since a hole does not need to be processed in the body 100 to expose the first and third lead-out patterns 231 and 232, matching between the connection electrodes 510 and 520 and the first and third lead-out patterns 231 and 232 may be more precisely achieved, and they may be collectively formed in a plurality of unit coils at a strip level or a panel level. In the case of the latter, a seed layer such as an electroless plating layer may be interposed between a hole and the connection electrodes 510 and 520 and between the first and third lead-out patterns 231 and 232 and the connection electrodes 510 and 520.

The connection electrodes 510 and 520 may be exposed outwardly from the body 100 (FIG. 2B) or disposed inside the body 100 (FIG. 2A), but a disposition of the connection electrodes 510 and 520 is not limited thereto.

The connection electrodes 510 and 520 may include a conductive material such as copper (Cu), aluminum (Al), silver (Ag), tin (Sn), gold (Au), nickel (Ni), lead (Pb), titanium (Ti), or alloys thereof, but a material of the connection electrodes 510 and 520 is not limited thereto.

Although not illustrated in the drawings, in this exemplary embodiment, an insulating layer, formed along surfaces of the first and third lead-out patterns 231 and 232, the coil patterns 311 and 312, the support member IL, and the second and fourth lead-out patterns 242 and 241, may be further included. The insulating layer may insulate the first and third lead-out patterns 231 and 232, the coil patterns 311 and 312, and the second and fourth lead-out patterns 242 and 241 from the body 100 and may include a known insulating material such as parylene or the like. A material of the insulating material may be any insulating material and is not limited. The insulating layer may be formed by vapor deposition or the like, but a method of forming the insulating layer is not limited thereto and may be formed by laminating an insulating film on both surfaces of the support member IL.

As described above, a defective waveform, caused by a significantly short distance between an external electrode and a coil, may be prevented.

In addition, a low-profile inductor, in which flow of flux is not disturbed by adjusting a ratio of a distance from a central surface between top and bottom surfaces of a support member to a top surface of a body and a distance from the central surface of the support member to a bottom surface of the body, may be implemented.

While exemplary embodiments have been shown and described above, it will be apparent to those skilled in the art that modifications and variations could be made without departing from the scope of the present disclosure as defined by the appended claims.

What is claimed is:

1. An inductor comprising:

a magnetic body including a thermosetting resin and magnetic metal powder particles;

a coil pattern embedded in the magnetic body;

a first external electrode and a second external electrode disposed on a first surface of the magnetic body to be respectively connected to opposing ends of the coil pattern; and a support member disposed inside the magnetic body to support the coil pattern in a thickness direction of the magnetic body, wherein b/a≥1.5, in which "a" denotes a distance from a central surface between top and bottom surfaces of the support member to a second surface of the magnetic body opposing the first surface of the magnetic body in the thickness direction, and "b" denotes a distance from the central surface of the support member to the first surface of the magnetic body in the thickness direction, the central surface of the support member being arranged in substantially parallel to the first surface of the magnetic body, and wherein the first surface of the magnetic body is a mounting surface of the inductor.

2. The inductor of claim 1, wherein b/a≤1.7/0.8.

3. The inductor of claim 1, wherein the coil pattern is disposed on the top and bottom surfaces of the support member opposing each other.

4. The inductor of claim 1, further comprising a connection electrode connecting the coil pattern and the first and second external electrodes to each other.

5. The inductor of claim 4, wherein the connection electrode is exposed outwardly from the magnetic body.

6. The inductor of claim 4, wherein the connection electrode is disposed inside the magnetic body.

7. The inductor of claim 1, wherein the magnetic metal powder particles are an alloy including at least one selected from the group consisting of iron (Fe), silicon (Si), chromium (Cr), aluminum (Al), and nickel (Ni).

8. The inductor of claim 1, wherein the coil pattern includes first and second lead-out patterns disposed near the opposing ends of the coil pattern, respectively.

9. The inductor of claim 8, further comprising first and second connection electrodes respectively connecting the first and second lead-out patterns to the first and second external electrodes, respectively.

10. The inductor of claim 8, wherein the coil pattern further includes third and fourth lead-out patterns respectively connected to the second and first lead-out patterns through vias.

11. The inductor of claim 10, wherein the coil pattern includes first and second coil patterns respectively disposed on the top and bottom surfaces of the support member, the first coil pattern, the first lead-out pattern, and the third lead-out pattern are disposed on the bottom surface of the support member in the magnetic body, and the second coil pattern, the second lead-out pattern, and the fourth lead-out pattern are disposed on the top surface of the support member.

12. The inductor of claim 11, wherein the third lead-out pattern is spaced apart from the first coil pattern on the bottom surface of the support member, and the fourth lead-out pattern is spaced apart from the second coil pattern on the top surface of the support member.

13. An inductor comprising:

a magnetic body; a coil pattern embedded in the magnetic body;

a first external electrode and a second external electrode disposed on a first surface of the magnetic body to be respectively connected to both ends of the coil pattern; and a support member disposed inside the magnetic body to support the coil pattern in a thickness direction of the magnetic body, wherein when "a" denotes a distance from a central surface between top and bottom surfaces of the support member to a second surface of the magnetic body opposing the first surface of the magnetic body in the thickness direction, and "b" denotes a distance from the central surface of the support member to the first surface of the magnetic body in the thickness direction, b/a≥1.5, and wherein a rest of surfaces of the magnetic body except the first surface are free of any portion of the first and second external electrodes.

14. The inductor of claim 13, wherein the coil pattern is disposed on the top and bottom surfaces of the support member opposing each other.

15. The inductor of claim 13, further comprising a connection electrode connecting the coil pattern and the first and second external electrodes to each other.

16. The inductor of claim 15, wherein the connection electrode is exposed outwardly from the magnetic body.

17. The inductor of claim 15, wherein the connection electrode is disposed inside the magnetic body.

* * * * *